United States Patent [19]

Penzias

[11] Patent Number: 5,450,481
[45] Date of Patent: Sep. 12, 1995

[54] CONFERENCE CALL PARTICIPATION TRACKING

[75] Inventor: Arno A. Penzias, Highland Park, N.J.

[73] Assignee: AT&T Corp., Murray Hill, N.J.

[21] Appl. No.: 350,745

[22] Filed: Dec. 7, 1994

Related U.S. Application Data

[63] Continuation of Ser. No. 66,456, May 24, 1993, abandoned.

[51] Int. Cl.[6] .................. H04M 3/42; H04M 1/00
[52] U.S. Cl. .................. 379/202; 379/206; 379/158
[58] Field of Search ............ 379/156, 157, 158, 201, 379/202, 204, 205, 206, 351, 416, 417

[56] References Cited

U.S. PATENT DOCUMENTS

| | | | |
|---|---|---|---|
| 4,691,347 | 9/1987 | Stanley et al. | 379/204 X |
| 5,195,086 | 3/1993 | Baumgartner et al. | 379/202 X |
| 5,267,305 | 11/1993 | Prohs et al. | 379/202 |
| 5,267,310 | 11/1993 | Yoshida | 379/416 |

Primary Examiner—Stephen Chin
Assistant Examiner—Paul Loomis
Attorney, Agent, or Firm—Kenneth M. Brown

[57] ABSTRACT

A method and apparatus for tracking participation in a conference call is disclosed. A conference tracker at a first location transmits a status signal to another conference tracker at a second location. The conference tracker at the second location receives the status signal and recognizes it as representative of an attribute of one or more of the parties at the first location. The attribute represented may be the identity of the first location, thereby informing the conference tracker at the second location that the first location remains connected to the conference call. In this manner, the conference tracker may inform a party of the number of connected locations or that a particular location has disconnected. The attribute represented may be the identity of the first location when a party at that location is speaking. In this manner, the conference tracker at the second location may thereby inform a listening party of the location of the speaking party. The attribute represented may be the identity of the speaking party, thereby enabling the conference tracker at the second location to determine which party is speaking. Status signals transmitted by each conference tracker may comprise audio pulses of unique frequencies, thereby enabling each conference tracker to determine the origin of each status signal. Consecutive pulses may be used to identify a particular status (e.g., connected or speaking).

30 Claims, 4 Drawing Sheets

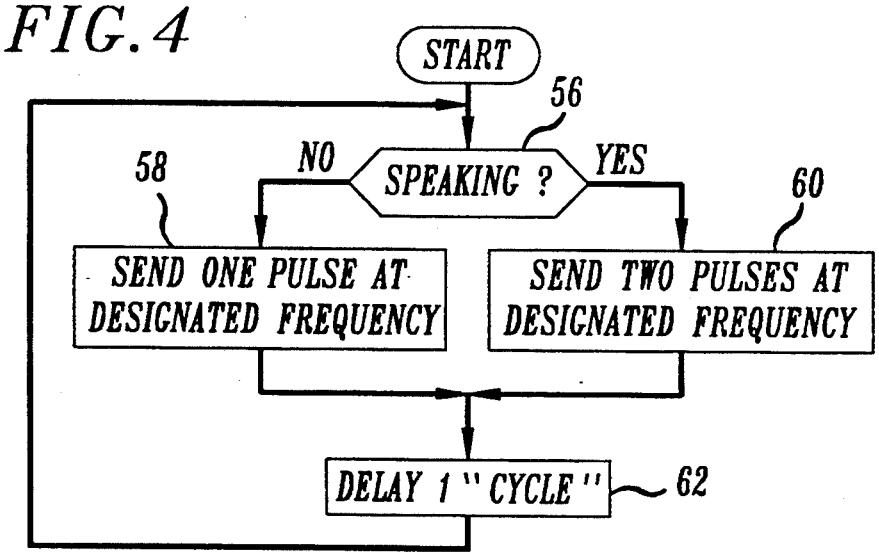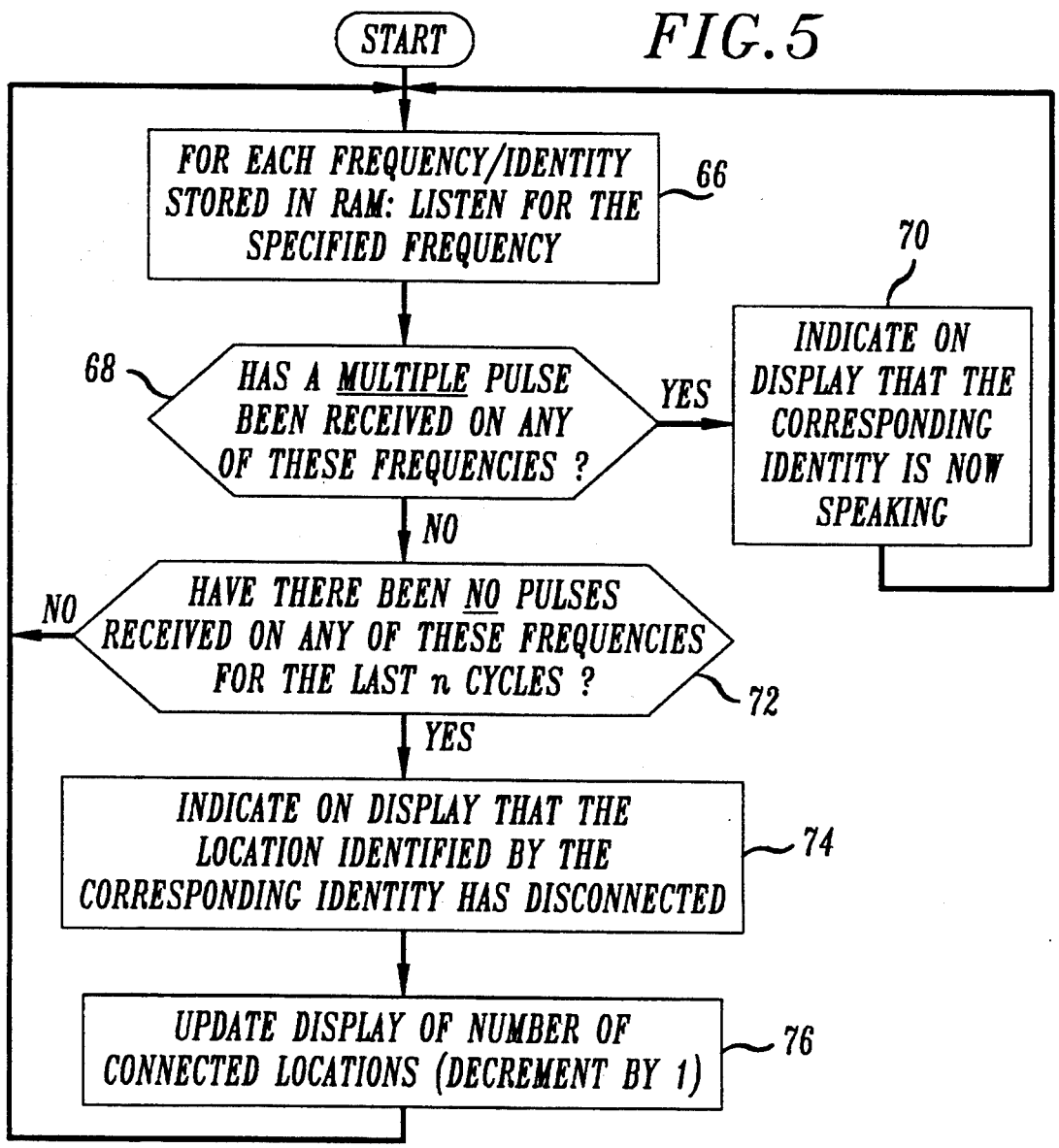

CONFERENCE CALL PARTICIPATION TRACKING

This application is a continuation of application Ser. No. 08/066,456, filed on May 24, 1993, now abandoned.

FIELD OF THE INVENTION

The present invention relates generally to the field of telephone communication and more specifically to telephone conference calling.

BACKGROUND OF THE INVENTION

Telephone conference calls allow multiple parties to participate in a single conversation. Conference calls couple a plurality of locations (usually more than two) with use of a communication channel. At each location, there may be one or more parties (participating persons) to the conversation. Each location may include, for example, a conventional telephone set used by a single party, or a conventional speakerphone used by one or more parties. The communication channel supporting a conference call typically comprises a conventional switched telephone network. Should the communication channel include a wireless (e.g., cellular) communication link, one or more of the participating "locations" may comprise a mobile cellular phone or speakerphone.

Although a widely used tool in business and industry, telephone conference calls suffer from certain problems which impact on their effectiveness as a substitute for other methods of communication, such as a face-to-face meeting. For example, during a typical conference call, a party cannot be sure who else is on the line (Le., connected) at any given time. Moreover, unless a listener is familiar with the voice of each participant in the call, it may be unclear which party is speaking at any given time. Questions such as "John, are you still on the line?" or "Who just said that?" need to be asked frequently. Such difficulties can cause the conversation to become less productive and often uncomfortable or even embarrassing.

SUMMARY OF THE INVENTION

The present invention provides a technique for tracking the participation of parties in a conference call. A participating (first)location transmits a tracking signal to another participating (second)location. The second location receives the tracking signal and recognizes it as representative of an attribute of one or more of the parties at the first (transmitting) location. Such attributes may include, for example, the location of a party, the location of a party presently speaking, and the identity of a speaking party.

Illustratively, tracking signals are transmitted and received at each location by a conference call tracking device. Such a device is preferably interposed between a telephone deskset and handset, connected to each by standard 4-wire telephone cords.

According to a first illustrative embodiment of the present invention, the party attribute recognized by a tracking device at the second location is an identity of the (first) location of a party to the conference call. In this manner, parties at the second location may be made aware that the first location remains connected to the conference call. Moreover, the tracking device at the second location may monitor this tracking signal. If the signal has not been received for a predetermined amount of time, the tracking device at the second location may inform a party that the first location and hence the parties there are no longer participating in the call. In addition, a party at the second location may be informed of the number of locations which remain connected to the conference call at a given time.

According to a second illustrative embodiment, the attribute recognized by a tracking device at a second location is an identity of the first location when one of the parties at the first location is presently speaking. In this manner, parties at the second location may be made aware that the presently speaking party is located at the first location. Where there are more than two locations connected to the conference call, the listening party may thereby be apprised of the location of the speaking party.

According to a third illustrative embodiment, the attribute recognized by a tracking device at the second location is an identity of the speaking party at the first location. In this manner, parties at the second location may be made aware of the identity of the speaking party. Where there are more than two parties to the conference call, the listening party may thereby determine which party is speaking.

In any of the illustrative embodiments of the present invention, the tracking signals may comprise one or more audio pulses of a predetermined frequency within the frequency band of the channel supporting the conference call. These pulses are combined with speech signals by a tracking device and transmitted across the communication channel. The predetermined frequency of the audio pulses may then be filtered out by a receiving tracking device such that a listening party hears only speech and not the audio pulses.

Alternatively, the embodiments may divide the channel bandwidth into subbands. Tracking signals from a given location which comprise one or more audio pulses of a predetermined frequency may be transmitted within one of these subbands. Such subbands may be filtered out by a receiving tracking device such that a listening party hears only speech. This division of channel bandwidth into subbands may be performed dynamically based on the number of locations participating in the conference call. In this manner, the portion of the frequency band which is not filtered out is advantageously maximized for a given number of participating locations, thereby improving the audio quality of the resultant speech signal.

BRIEF DESCRIPTION OF THE DRAWINGS

FIG. 4 is a flow diagram illustrating the transmission of status signals from a participating location in accordance with an embodiment of the present invention.

FIG. 5 is a flow diagram illustrating a method of recognizing status signals at a participating location in accordance with an embodiment of the present invention.

DETAILED DESCRIPTION

For clarity of explanation, the illustrative embodiment of the present invention is presented as comprising individual functional blocks (including functional blocks labeled as "processors"). The functions these blocks perform may be provided through the use of either shared or dedicated hardware, including, but not limited to, hardware capable of executing software. (Use of the term "processor" should not be construed to refer exclusively to hardware capable of executing software.)

Illustrative embodiments may comprise digital signal processor (DSP) hardware, such as the AT&T DSP16 or DSP32C, read-only memory (ROM) for storing software performing the operations discussed below, and random access memory (RAM) for storing DSP results. Very large scale integration (VLSI) hardware embodiments, as well as custom VLSI circuitry in combination with a general purpose DSP circuit, may also be provided.

Figure 1:
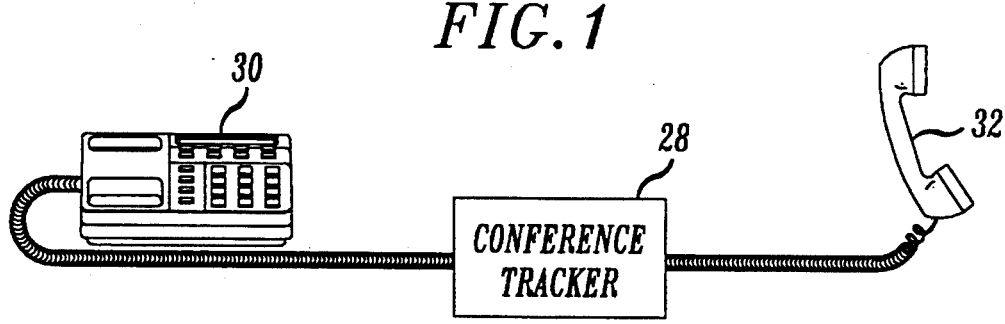
FIG. 1 illustrates the addition of a conference call tracking device to a conventional telephone set in accordance with one embodiment of the present invention.

FIG. 1 illustrates a conventional telephone set with the addition of a conference call tracking device ("conference tracker") in accordance with an embodiment of the present invention. Conference tracker 28 is connected in-line on the "4-wire" side of a conventional telephone set, namely, between deskset 30 and handset 32. Alternatively, conference tracker 28 may be built into the telephone set as an adjunct component, also connected in-line on the 4-wire side of the instrument. Each party in a conference call may advantageously have conference tracker 28 included in either manner. Further alternate embodiments may comprise conference trackers which are connected on the 2-wire side of the instrument. Each conference tracker included in a conference call tracks the participation of parties at other locations. Moreover, conference tracker 28 enables conference trackers at other locations to track the participation of parties at the location of conference tracker 28.

Figure 2:
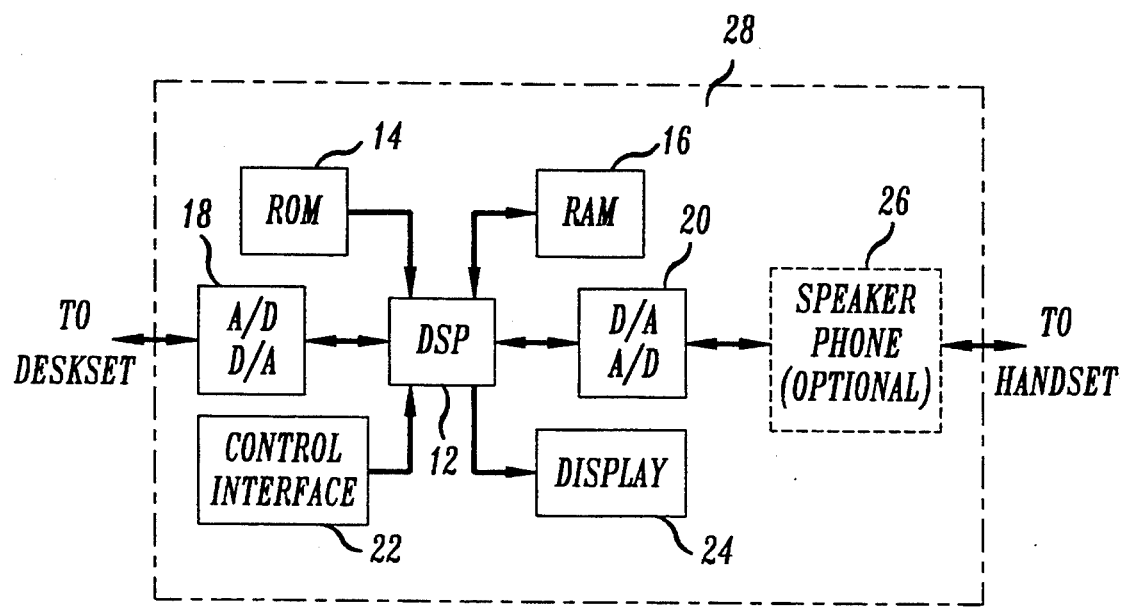
FIG. 2 illustrates a block diagram of the conference call tracking device of FIG. 1.

FIG. 2 presents a block diagram of the illustrative conference tracker 28 of FIG. 1. Conference tracker 28 comprises digital signal processor (DSP) 12, codec 18, codec 20, read-only-memory (ROM) 14, random access memory (RAM) 16, control interface 22, display 24 and optional speakerphone 26. DSP 12 controls the operation of the device. Signals which pass between deskset 30 and handset 32 pass through and are monitored by DSP 12. DSP 12 may be implemented with a conventional digital signal processor such as the aforementioned AT&T DSP16.

Codec 18 converts analog signals from the deskset to digital format, and converts digital signals from DSP 12 to analog format. Similarly, codec 20 converts signals from the handset from analog to digital format and converts signals which are sent to the handset from digital to analog format. In this manner, all processing performed by DSP 12 is advantageously performed on digital signals. Codecs 18 and 20 may be implemented with conventional analog-to-digital and digital-to-analog converters.

ROM 14 stores program code to control the operation of DSP 12. In particular, the procedures illustrated in FIGS. 3-5 may be implemented in software and stored in ROM 14. ROM 14 may also store selected fixed data.

RAM 16 stores data which is used to recognize and identify status signals transmitted by conference trackers at other locations. In particular, the number of other locations currently connected to the conference call along with a representation of the (unique) status signal sent by each of the trackers at other locations is stored in RAM 16. In addition, RAM 16 may store identification data, by which each location or party to the conference call may be identified to parties at the location of the given conference tracker 28. This identification data may be stored in RAM 16 as text, representing, for example, the name of the given party or location.

Control interface 22 enables parties at the location of the given conference tracker 28 to control the operation of the tracking device. Control interface 22 may, for example, comprise conventional buttons which activate specific functions when pressed. Display 24 provides for the display of information to parties at the given location of conference tracker 28. Display 24 may be implemented with a conventional alphanumeric display, such as an LCD (liquid-crystal display).

Optional speakerphone 26 may be provided to enable the use of conference tracker 28 by multiple parties at the same location. Since it is preferred that conference tracker 28 be interposed on the 4-wire side of the telephone set, conventional speakerphone capability built into deskset 30 may be inadequate unless conference tracker 28 is also built into deskset 30. Therefore, it is advantageous to provide speakerphone 26 as an optional feature built into conference tracker 28. Speakerphone 26 comprises a microphone and a speaker, and may be implemented with conventional components.

According to one embodiment, conference tracker 28 transmits a "unique" identifying signal (referred to as a status signal) at regular intervals (referred to as cycles). A status signal from conference tracker 28 comprises, for example, one or more audio pulses of a frequency which is distinct from that frequency employed by any of the other conference trackers used in a conference call. In addition to transmitting such pulses, conference tracker 28 monitors the line to detect and recognize the unique status signals transmitted by the other conference trackers connected to the conference call. In so doing, conference tracker 28 may be continuously apprised of the status of the conference call on an individual location by location basis (e.g., which locations remain connected on the call).

Conference tracker 28 may use modified versions of the status signal to transmit information in addition to an indication that a location remains connected to the conference call. For example, according to one embodiment, two consecutive audio pulses of the conference tracker's assigned (unique) frequency may be transmitted when a party at the location of the transmitting conference tracker is speaking. When no party at that location is speaking, only one such pulse is transmitted by the tracker. In this manner, the other ("listening") conference trackers may be continuously apprised not only of which locations remain connected, but also of the location of a speaking party.

In accordance with another embodiment, a different version of the status signal may be transmitted depending on which particular party is speaking at a location having multiple parties. For example, each party at the location may be assigned a different number of pulses (greater than one) of the location's (conference tracker's) assigned audio frequency. Thus, a listening conference tracker may be able to identify for parties at its location not only the location of the speaking party ("speaking location"), but also the particular party who is speaking at that location.

Figure 3:
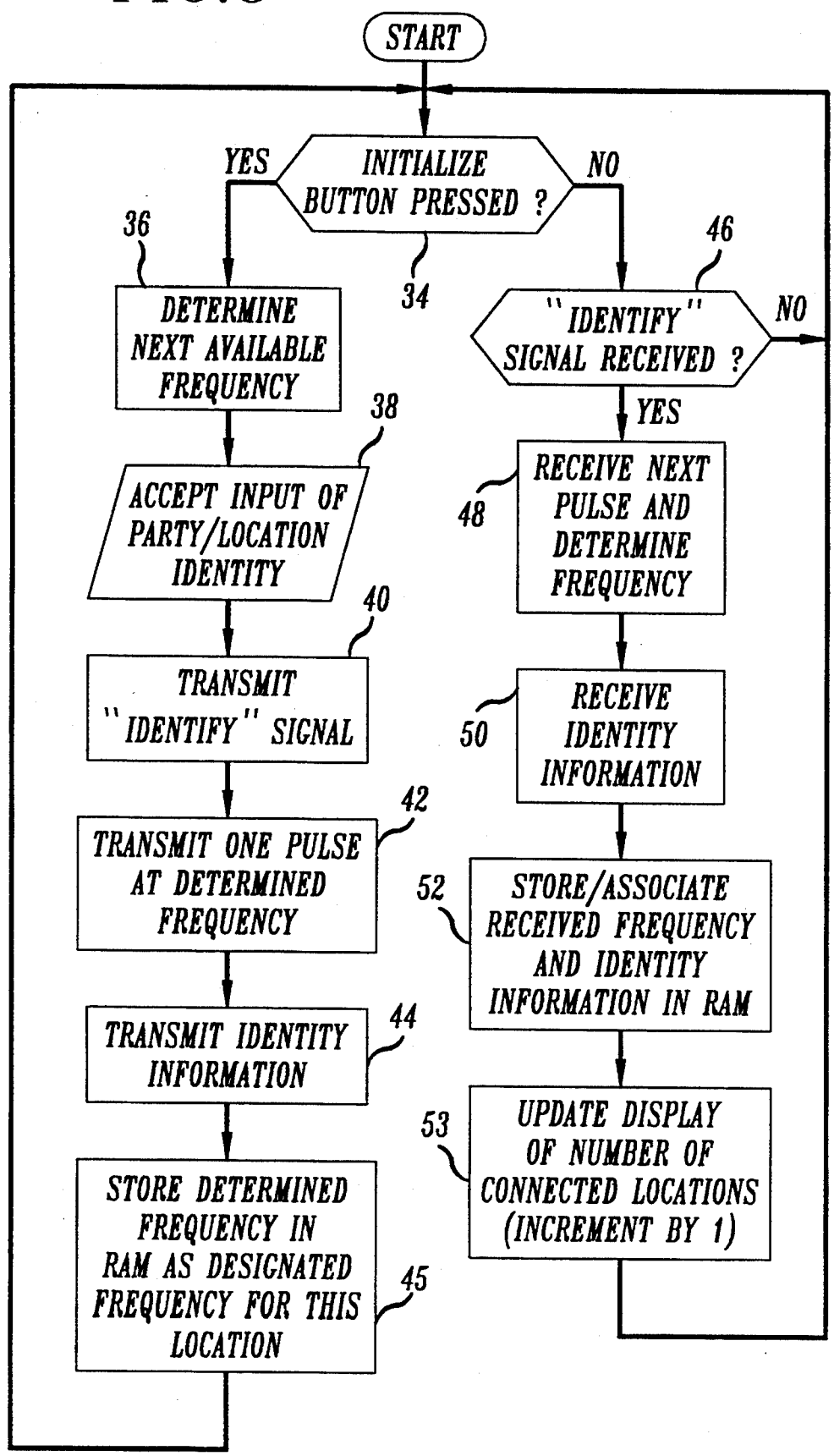
FIG. 3 is a flow diagram illustrating the initialization of conference call tracking in accordance with an embodiment of the present invention.

FIGS. 3-5 present flow diagrams of procedures performed by an illustrative embodiment of the present invention. These procedures may be implemented in software. This software may be stored in ROM 14 and executed by DSP 12. The software implementing these procedures are advantageously executed as concurrent processes, i.e., executed simultaneously. If DSP 12 is not provided with a conventional multi-tasking or time-shared operating system environment, a simple conventional executive control program may be included. For example, such an executive control program might call each of the three processes in turn as a subroutine. Upon each such subroutine call, the main loop of the called subroutine is executed once, after which the subroutine returns control to the executive program.

FIG. 3 is a flow diagram illustrating the initialization of conference call tracking. At the inception of a conference call, a party at each location in turn presses an "initialize" button on control interface 22 of conference tracker 28. This activity may be instigated, for example, by a "roll call" initiated by a conference call chairperson. In particular, a chairperson might press the initialize button on his or her conference tracker and then provide the appropriate identity data as described in the discussion of step 38 below. Conference trackers at each other location may be similarly initialized in turn, in response to direction of the chairperson. While use of a chairperson can facilitate the initialization process, no chairperson is required according to the invention.

Specifically, the procedure of FIG. 3 recognizes that the initialization sequence for a given location is to be performed in decision step 34. Steps 36, 38, 40, 42, 44 and 45 are thereby performed. Since the status signal transmitted by conference trackers at each location is unique, step 36 determines which frequencies have already been assigned to trackers at other locations, and selects an available (unassigned) frequency for the conference tracker being initialized. The status signal for the initialized conference tracker will comprise one or more audio pulses of the frequency so determined.

Step 38 accepts data input from one or more parties at the given location. In one embodiment, this data will identify the location by a familiar name, such as the name of the organization or of the party (or one of the parties) at that location. In an alternative embodiment, each of a plurality of parties at the given location may input individual identity information (e.g., their names) so that individual speakers may be subsequently identified by other conference trackers. In this case, each party's identity information is input in turn, and each is associated with an "index" which may be subsequently used to distinguish the distinct parties at the given location.

The input accepted by step 38 may be provided by key entry. For example, the touch-tone keys on the deskset may be used to spell a name. These signals can then be subsequently converted to text, by, for example, conventional dual-tone multi-frequency (DTMF) recognition techniques. Alternatively, this data may be provided by speech input. A party may speak his or her name or the name of the organization into handset 32 (or speakerphone 26). This audio signal may be subsequently converted into a digitally encoded representation for convenient storage. Moreover, one of these two approaches to the input of identity information may be used and followed by a conversion to the other format internal to conference tracker 28. In other words, the information may be input as speech and then converted to text by the application of conventional speech recognition techniques. Alternatively, the information may be input as text (e.g., by key input) and then converted to an audio speech signal by the application of conventional speech synthesis techniques. In any case, the data obtained by step 38 may be stored in RAM 16 for subsequent transmission to other conference trackers participating in the conference call.

Step 40 begins the process of informing the other participating conference trackers about the given initialized conference tracker 28. In particular, step 40 transmits a predetermined "identify" signal (e.g., a pulse of a predetermined frequency distinct from the frequencies which are assigned to the tracking devices for their individual status signals) to inform the other conference trackers that identification data is forthcoming. Step 42 then transmits an audio pulse of the frequency which the given conference tracker 28 has assigned to itself at step 36, and step 44 transmits the identity information input at step 38. Where individual identity information is provided for each of a plurality of parties, step 44 may transmit data identifying each party individually. In this case, each party would be advantageously associated with a corresponding index. This index may be used, for example, to determine the number of consecutive status signal pulses which will be transmitted to represent that specific party when speaking.

Finally, step 45 stores the frequency which conference tracker 28 has assigned to itself (as determined in step 36) in RAM 16. In this manner, this data will remain available to DSP 12 so that the status pulses which are transmitted are of the appropriate frequency to identify the conference tracker's location.

When conference tracker 28 is not performing an initialization sequence to inform other conference trackers about its own location, it is "listening" for initialization sequences from other conference trackers. In particular, decision step 46 determines if some other conference tracker connected to the conference call has begun an initialization sequence. It does this by listening for the aforementioned "identify" signal. This, of course, corresponds to the performance of step 40 by the conference tracker which is transmitting the "identify" signal. If such a signal is received, steps 48, 50 and 52 are performed so that conference tracker 28 becomes apprised of the identity information for the location of the transmitting conference tracker. Step 53 is also performed to maintain a display of the number of locations which are connected to the conference call at any given time.

Specifically, step 48 receives the next pulse transmitted after the "identify" signal and determines its frequency. This step 48 corresponds to the performance of step 42 by the transmitting conference tracker. Step 50 then receives the identity information, which corresponds to the performance of step 44 by the transmitting conference tracker. Step 52 then stores the received frequency together with the received identity information in RAM 14. In this manner, conference tracker 28 will be able to track the participation of other locations (i.e., conference trackers) in the conference call, and will be able to identify each location based on the frequency of its conference tracker's status pulse. Finally, step 53 updates a display of the number of locations which are connected to the conference call by incrementing the number by one.

Conference tracker 28 continues to listen indefinitely for initialization sequences transmitted by other conference trackers. In this manner, it is not necessary to know in advance the number of locations that will be participating in the conference call. That is, a conference tracker at each location which is to participate performs an initialization sequence in turn. All other connected conference trackers receive and store the corresponding frequency and identity information. All participating locations are advantageously connected to the conference call before any initialization sequences are performed. In an alternative embodiment, however, additional locations may be added to the conference call at any time.

FIG. 4 is a flow diagram illustrating the transmission of status signals from conference tracker 28 in accordance with an embodiment of the present invention. The procedure of FIG. 4 is executed after the initialization sequence of FIG. 3, and executes continually for as long as the given location remains connected to the conference call.

Specifically, decision step 56 determines whether a party at the location of conference tracker 28 is presently speaking. This may be decided, for example, by determining whether there is a sufficiently strong (greater than some predetermined threshold) audio signal input being received from handset 32 or from speakerphone 26. (Conventional techniques used in typical speakerphones may be employed to distinguish between a speaking party and background noise.) If no party at the participating location is speaking, step 58 transmits a single pulse of the frequency which has been selected by and assigned to the given location by step 36 of the initialization procedure of FIG. 3. If a party at this location is speaking, step 60 transmits two consecutive pulses at the designated frequency. In either case, step 62 then delays execution for a predetermined amount of time before the procedure of FIG. 3 is repeated. The predetermined amount of time for which execution is delayed is referred to as a "cycle."

In an alternative embodiment, step 60 may transmit two or more pulses to indicate which one of a plurality of parties at the given location is speaking. The identity of a speaking party (and hence the number of pulses to be transmitted) may be determined, for example, by conventional speaker recognition techniques. Alternatively, the speaker's identity may be specified by manual input (e.g., by pressing a corresponding button on control interface 22 or an appropriate touch-tone key on deskset 30) at the speaking party's location. Illustratively, the duration of the status signal pulses may be 50 milliseconds, the delay between consecutive pulses transmitted by step 60 may be 50 milliseconds, and the duration of a cycle may be 3 seconds.

The status signals which are transmitted according to the procedure of FIG. 4 may be combined with the audio (e.g., speech) input received by handset 32 or speakerphone 26 at the given location of conference tracker 28 and transmitted together across the telephone communication channel. Advantageously, the specific frequencies or frequency bands which have been allocated for status signals are filtered out from the speech input before these status signals are combined with the speech signal for transmission. With no interference from the speech input at these frequencies, the task of detecting the presence of status signal pulses at the receiving conference tracker becomes straightforward.

FIG. 5 is a flow diagram illustrating a method of recognizing status signals by conference tracker 28 at a participating location in accordance with an embodiment of the present invention. This method enables conference tracker 28 to track the participation of conference trackers at other locations of the conference call. The procedure of FIG. 5 advantageously begins after the execution of the initialization sequence of FIG. 3, and executes continually for as long as the given location remains connected to the conference call.

Specifically, step 66 examines each of the frequencies which have been assigned to other conference trackers participating in the conference call. In particular, step 66 "listens" for a pulse at any of these frequencies. If the specific frequencies or frequency bands which have been allocated for status signals have been filtered out from the conversational input before the signals are combined, conventional techniques may be employed to recognize the presence of a pulse at each specified frequency (or band). For example, the energy level of the transmitted signal within a narrow frequency band surrounding the specified frequency may be measured. If the measured energy level exceeds a predetermined threshold, a pulse of the specified frequency has been detected. Step 66 may be performed based on the list of frequencies and associated identities that have been stored in RAM 16 as a result of the frequency assignments made in step 52 (during the initialization process of FIG. 3).

Decision step 68 checks for a multiple pulse (i.e., two or more consecutive pulses) on any of these assigned frequencies. If such a multiple pulse is detected, step 70 causes DSP 12 to indicate on display 24 the identity of the speaking party or the location of the speaking party. Such a message may be either displayed continuously or may only be displayed upon request (e.g., upon pressing a particular button on control interface 22). According to an embodiment of the present invention in which each location has a single identity, the identity associated with the detected frequency is displayed. According to another embodiment in which each of a plurality of parties at a location may be individually identified, the identity of the speaking party may be determined, for example, based on both the detected frequency and the number of consecutive pulses received (see the discussion of FIG. 4, step 60).

If a multiple pulse has not been detected in decision step 68, decision step 72 determines whether there has been an absence of any pulses for a predetermined amount of time on each of these assigned frequencies. If there has been such an absence of pulses on any one of these frequencies for this predetermined time frame, step 74 is performed. In particular, step 74 causes DSP 12 to indicate on display 24 that the location(s) identified by the absence of pulses as determined by step 72 has disconnected from the conference call. In addition, step 76 updates a display indicating the number of locations presently connected to the conference call by decrementing the number by one (or more, if more than one location is deemed disconnected).

Since the conference tracker at each connected location transmits a status signal every cycle, the aforementioned time frame over which an absence of pulses indicates disconnection is advantageously set to a number, n, of cycles. Illustratively, n may be 5, thereby ensuring that a false reading of a disconnection is unlikely as a result of occasional missing or missed status signals. In this manner, if the cycle time is illustratively 3 seconds, a disconnected location may be identified 15 seconds after it disconnects from the conference call.

It may be desirable to communicate certain information to a party via an audio message in addition to or instead of by means of display 24. In such a case, the identification data for each party and/or location may be stored in RAM 16 as a digitally encoded audio message (rather than text), comprising, for example, a spoken name. In addition, the fixed portion of such a message (e.g., "The party presently speaking is" for step 70 or "has disconnected from the conference call" for step 74) may be stored in ROM 14, also as a digitally encoded audio message. Each of steps 70 and 74 may thereby combine and decode the fixed portion of the appropriate message with the appropriate party or location name to produce an informative audio message. Conventional signal compression techniques may be implemented in DSP 12 to reduce the amount of storage required in ROM 14 and/or in RAM 16.

Figure 6:
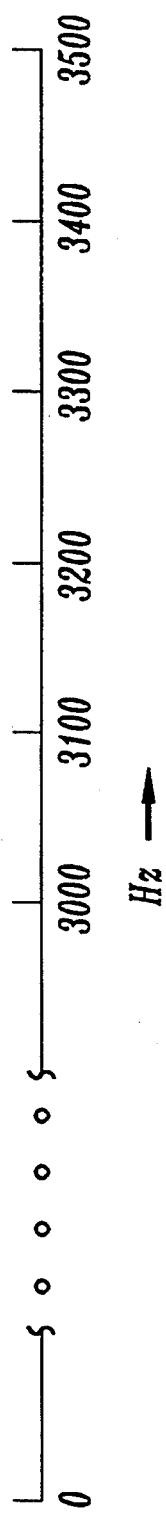
FIG. 6 presents an allocation of the frequency spectrum according to one embodiment of the present invention.

FIG. 6 shows an allocation of the frequency spectrum according to one embodiment of the present invention. This allocation technique may be used to select an unassigned frequency as per step 36 of the initialization procedure of FIG. 3. According to this embodiment, the upper portion of the frequency band of the telephone communication channel is allocated to carry status signals. However, rather than allocating a fixed portion of the overall frequency band, the allocation is performed dynamically, based on the number of participating locations. By allocating only that portion of the frequency band that is needed for the given number of participating locations, the portion of the frequency band which remains available for conversation may be maximized.

Specifically, the first conference tracker to perform the initialization sequence of FIG. 3 selects a frequency at the top of the applicable frequency band. Then, each successive conference tracker which performs the initialization sequence selects the next lower available frequency. Illustratively, the frequency band over which audio signals may be accurately transmitted across a telephone communication channel extends to 3500 Hz. In addition, with pulse durations illustratively set at 50 milliseconds, the frequency resolution with which DSP 12 can identify a pulse's frequency will illustratively be assumed to be 20 Hz. Therefore, as shown in FIG. 6, the first conference tracker illustratively selects 3500 Hz as its location's assigned frequency, the second conference tracker illustratively selects 3480 Hz as its location's assigned frequency, the third conference tracker illustratively selects 3460 Hz as its Location's assigned frequency, and so on, in 20 Hz decrements.

The aforementioned filtering of the combined transmission (i.e., the speech signal plus the status signals) may be performed by an adaptive low-pass filter, implemented in DSP 12 by conventional techniques. Specifically, the low-pass filter passes all frequencies less than or equal to 20 Hz below the lowest frequency which has been assigned. For example, in the case illustrated in FIG. 6, five frequencies have been assigned in 20 Hz decrements (i.e., in highest-to-lowest order) to five participating locations. As a result, frequencies of 3400 Hz and below are "available" for the speech signals. DSP 12 of each conference tracker adaptively filters the combined transmission before passing it through to the listening parties, in accordance with idealized transfer function 78 as shown in FIG. 6. In addition, DSP 12 of each conference tracker 28 adaptively filters the audio input signal received from handset 32 or speakerphone 26 by transfer function 78, before combining it with the transmitted status signals. In this manner, the portion of the frequency band allocated to the status signals will be free from interference from the speech input signal, simplifying the task of pulse detection.

According to a further illustrative embodiment of the present invention, the allocation of assigned frequencies to conference trackers may also be advantageously adjusted when a location becomes disconnected from the conference call. When a location disconnects, one or more of the remaining locations may have their frequency assignment altered. For example, the remaining conference tracker with the lowest assigned frequency may adopt the frequency which had been assigned to the disconnected location. This change in frequency assignment may be anticipated by each conference tracker as soon as it recognizes that a location has become disconnected. However, the conference tracker which is adopting the frequency of the disconnected location delays its change of frequency assignment for a predetermined amount of time before transmitting status pulses at its new frequency. This delay ensures that all other conference trackers will recognize the disconnection and anticipate this change accordingly. In the foregoing manner, the portion of the frequency band which remains available for speech may be maximized, even after some locations become disconnected.

The signals which are generated and transmitted by the conference trackers of the illustrative embodiments of the present invention may be generically referred to as tracking signals. Tracking signals comprise any signals which are transmitted by one tracking device to another for the purpose of providing information related to the tracking of conference call participation. Specifically, the information being provided is typically representative of an attribute of one or more of the parties at a given location. Examples of such attributes include the identity of a party or of a location, the fact that a location is connected to a conference call, and the fact that a given party or a party at a given location is speaking. Examples of tracking signals include the aforementioned status signals and "identify" signals, as well as identity information transmitted between tracking devices.

Although conference calls typically comprise only human participants communicating via conventional or cellular telephones or speakerphones, it is to be understood that a conference call as used herein may also include automata other than telephones or speakerphones which may be connected to the communication channel. For example, tape recorders or tape players, fax machines, computers or other devices which do not provide a direct or immediate human interface to the conversation may be included as "participants" in the conference call. As used herein, however, the term "party" is intended to include only human participants.

Although a number of specific embodiments of this invention have been shown and described herein, it is to be understood that these embodiments are merely illustrative of the many possible specific arrangements which can be devised in application of the principles of the invention. Numerous and varied other arrangements can be devised in accordance with these principles by those of ordinary skill in the art without departing from the spirit and scope of the invention.

I claim:

1. A method for tracking participation in a conference call, said conference call including a plurality of parties at a plurality of locations, wherein a tracking signal is transmitted from a first one of said locations to a second one of said locations, said method comprising the steps of:

recognizing said tracking signal at said second location as representative of an attribute of one or more parties at said first location, wherein said attribute reflects an identity of the location of the one or more parties; and detecting whether said tracking signal has not been transmitted from said first location for a predetermined amount of time.

2. The method according to claim 1 further comprising the step of communicating to one or more of the parties at said second location a disconnection signal when said tracking signal has not been transmitted from said first location for a predetermined amount of time, said disconnection signal reflecting that said first location is no longer connected to said conference call.

3. The method according to claim 2 wherein said communicating step comprises generating an audible disconnection signal.

4. The method according to claim 2 wherein said communicating step comprises providing said disconnection signal to a display.

5. The method according to claim 3 wherein said disconnection signal comprises a location identifier signal identifying said first location, said location identifier signal having been generated by speech input at said first location.

6. The method according to claim 2 wherein said disconnection signal comprises a location identifier signal identifying said first location, said location identifier signal having been generated by key entry input at said first location.

7. The method according to claim 1 further comprising the step of monitoring whether tracking signals have not been transmitted from one or more of said locations for said predetermined amount of time to determine a number of said locations connected to said conference call.

8. The method according to claim 7 further comprising the step of providing a signal reflecting said number to one or more of the parties at said second location.

9. The method according to claim 1 wherein said attribute further reflects an identity of the location at which a party is speaking, the method further comprising the step of:

communicating to one or more of the parties at said second location a speaking location signal reflecting the identity of said location at which a party is speaking.

10. The method according to claim 9 wherein said communicating step comprises generating an audible speaking location signal.

11. The method according to claim 9 wherein said communicating step comprises providing said speaking location signal to a display.

12. The method according to claim 9 wherein said speaking location signal comprises a location identifier signal identifying said first location, said location identifier signal having been generated by speech input at said first location.

13. The method according to claim 9 wherein said speaking location signal comprises a location identifier signal identifying said first location, said location identifier signal having been generated by key entry input at said first location.

14. The method according to claim 1 wherein said attribute further reflects an identity of a party who is speaking, the method further comprising the step of:

communicating to one or more of the parties at said second location a speaking party signal reflecting the identity of said party who is speaking.

15. The method according to claim 14 wherein said communicating step comprises generating an audible speaking party signal.

16. The method according to claim 14 wherein said communicating step comprises providing said speaking party signal to a display.

17. The method according to claim 14 wherein said speaking party signal comprises a party identifier signal identifying said speaking party, said party identifier signal having been generated by speech input at said first location.

18. The method according to claim 14 wherein said speaking party signal comprises a party identifier signal identifying said speaking party, said party identifier signal having been generated by key entry input at said first location.

19. The method according to claim 1 wherein said tracking signal is combined with a speech signal for transmission across a communication channel.

20. The method according to claim 19 further comprising the step of filtering said combined tracking and speech signal at said second location to distinguish said tracking signal from said speech signal.

21. The method according to claim 20 wherein said communication channel comprises a plurality of frequency subbands and wherein said filtering step comprises filtering one or more of said subbands to distinguish said tracking signal from said speech signal.

22. The method according to claim 21 wherein said communication channel is divided into said plurality of subbands based on a number of said locations of said conference call.

23. The method according to claim 21 wherein said communication channel is divided into said plurality of subbands based on a number of said locations of said conference call which have transmitted said tracking signals.

24. The method according to claim 21 wherein said communication channel is divided into said plurality of subbands based on a number of said locations of said conference call which have transmitted said tracking signals within a predetermined amount of time.

25. An apparatus for tracking participation in a conference call, said conference call including a plurality of parties at a plurality of locations, wherein a tracking signal is transmitted from a first one of said locations to a second one of said locations, said apparatus comprising:

means for recognizing said tracking signal as representative of an attribute of one or more parties at said first location, wherein said attribute reflects an identity of the location of the one or more parties; and means for detecting whether said tracking signal has not been transmitted from said first location for a predetermined amount of time.

26. The apparatus according to claim 25 wherein said attribute further reflects an identity of the location at which a party is speaking, the apparatus further comprising:

means for communicating to one or more of the parties at said second location a speaking location signal reflecting the identity of said location at which a party is speaking.

27. The apparatus according to claim 25 wherein said attribute further reflects an identity of a party who is speaking, the apparatus further comprising:

means for communicating to one or more of the parties at said second location a speaking party signal reflecting the identity of said party who is speaking.

28. The apparatus according to claim 25 wherein said tracking signal is combined with a speech signal for transmission across a communication channel, said apparatus further comprising means for filtering said combined tracking and speech signal to distinguish said tracking signal from said speech signal.

29. The apparatus according to claim 28 wherein said communication channel comprises a plurality of frequency subbands and wherein said filtering means comprises means for filtering one or more of said subbands to distinguish said tracking signal from said speech signal.

30. The apparatus according to claim 25 wherein said apparatus is coupled between a telephone deskset and a telephone handset.

* * * * *